Figure 2:
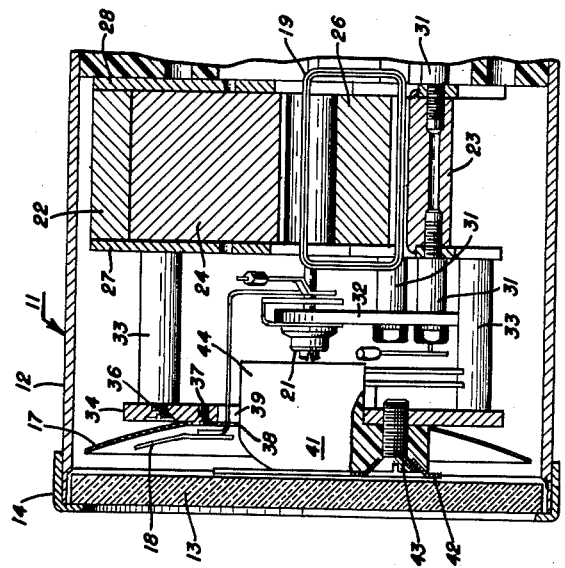

Dec. 11, 1962  J. BEBEL  3,068,354
DIAL ILLUMINATING MEANS
Filed Aug. 3, 1959  4 Sheets-Sheet 1

JOSEPH BEBEL
INVENTOR.

BY
Rudolph J. Quick
ATTORNEY

Dec. 11, 1962  J. BEBEL  3,068,354
DIAL ILLUMINATING MEANS
Filed Aug. 3, 1959  4 Sheets-Sheet 2

JOSEPH BEBEL
INVENTOR.

BY
Rudolph J. Junick
ATTORNEY

Dec. 11, 1962   J. BEBEL   3,068,354
DIAL ILLUMINATING MEANS
Filed Aug. 3, 1959   4 Sheets-Sheet 3
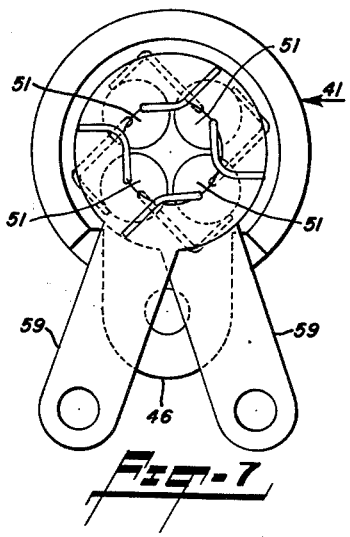
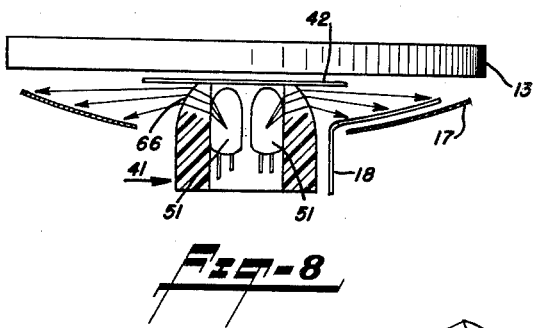
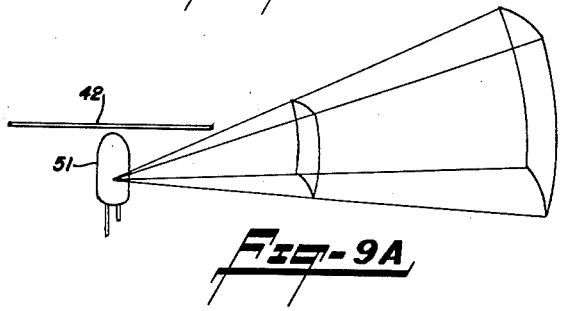
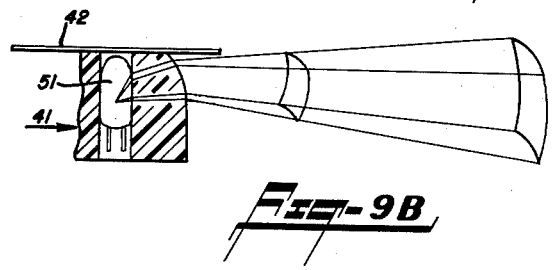
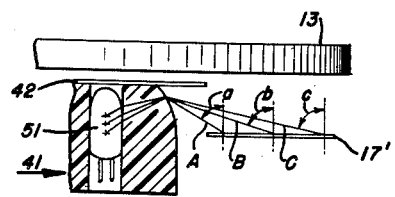
JOSEPH BEBEL
INVENTOR.
BY
*Rudolph J. Jurick*
ATTORNEY Dec. 11, 1962            J. BEBEL            3,068,354
DIAL ILLUMINATING MEANS Filed Aug. 3, 1959                         4 Sheets–Sheet 4

JOSEPH BEBEL
INVENTOR.

BY
Rudolph J. Lurick
ATTORNEY

United States Patent Office 3,068,354
Patented Dec. 11, 1962

3,068,354
DIAL ILLUMINATING MEANS
Joseph Bebel, Lakewood, N.J., assignor, by mesne assignments, to Daystrom, Incorporated, Murray Hill, N.J., a corporation of Texas
Filed Aug. 3, 1959, Ser. No. 831,368
3 Claims. (Cl. 240—2.1)

This invention relates to means for illuminating the dial of an instrument and more particularly to a compact arrangement for uniformly illuminating an electrical instrument dial without light leakage visible to an observer.

In many applications of electrical instruments no means for illuminating the instrument dial are necessary or required, since the dial, and associated pointer, are adequately lighted by the available ambient light. Often, however, when it becomes necessary to read the instrument in the dark (as, for example, aircraft instruments) the instrument dial must be illuminated. Such illumination must be reliable, and in the case of aircraft instruments, must not interfere with the pilot's vision outside of the cockpit. Further, since space and weight are limiting factors in aircraft construction, the lighting for the instrument should preferably occupy a minimum amount of space and be of a light-weight construction.

In many prior art instrument dial illuminating means, a lamp or lamps are arranged about the periphery of the dial for the illumination thereof. As is understood by those skilled in this art, the intensity of light on the dial is a function of the square of the distance from the lamp to the dial. With lamps located at the periphery of the dial, it will be understood that it is difficult to obtain a uniform illumination of the dial. In the dial illuminating means of my invention, one or more light sources are located adjacent the instrument axis whereby the intensity of light from any lamp is substantially uniform at any given radius on the dial.

The lamps in the lighting arrangement of my invention are mounted in a hub assembly positioned at the instrument axis. The hub is curved to provide a refracting surface for the light, the curvature being such that a lens effect is produced, rather than a prismatic effect. By effectively focusing the light on the dial, the effects of the above-described "Inverse Square" law are further reduced. The focusing thereof also serves to reduce stray light from the instrument to a minimum.

As is further well understood by those skilled in this art, the illumination provided by a light source on the instrument dial is a function of the angle at which the light strikes the dial, and in particular, the illumination varies as the cosine of the incident light angle. The effects of the above-described cosine law are reduced by use of a dish-shaped plate and arcuate pointer which conforms, generally, to the curved scale plate, whereby the incident angle is reduced with increasing distance from the light source.

An object of this invention is the provision of an arrangement for the illumination of the dial of an instrument by means of which the dial is uniformly lighted with a minimum of stray lighting.

An object of this invention is the provision of an arrangement for the illumination of an instrument dial by means of which a light source is positioned adjacent the instrument axis in front of the said dial.

An object of this invention is the provision of an economical, light-weight and compact instrument dial lighting arrangement.

An object of this invention is the provision of an instrument which includes a dish-shaped dial, a light source in front of the dial adjacent the dial axis, and a transparent hub for focusing the light from the source onto the side dial.

These and other objects and advantages will become apparent from the following description when taken with the accompanying drawings. It will be understood the drawings are for purposes of illustration and are not to be construed as defining the scope or limits of the invention, reference being had for the latter purpose to the appended claims.

Figure 1:
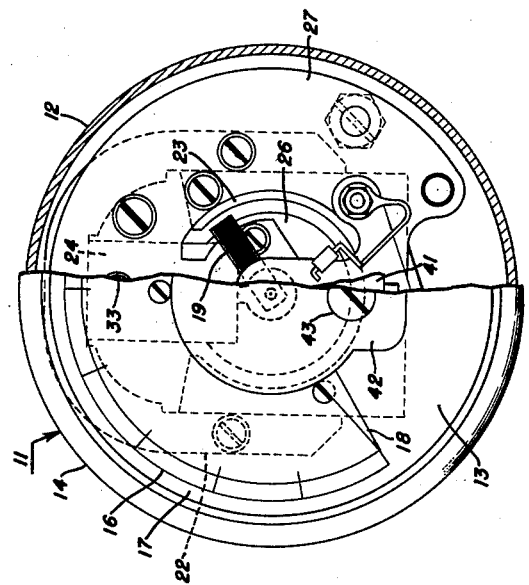
Figure 3:
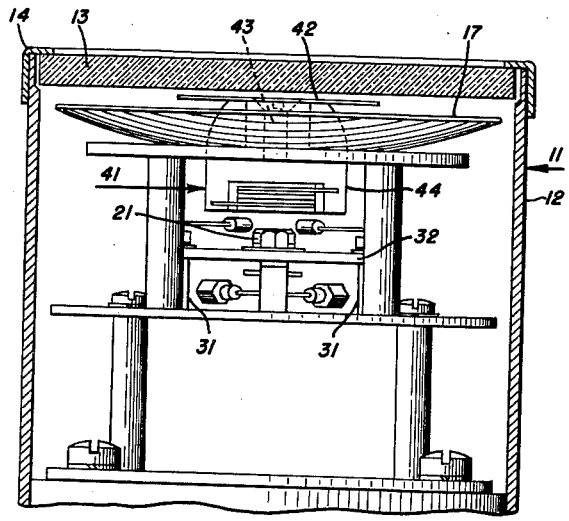
Figure 4:
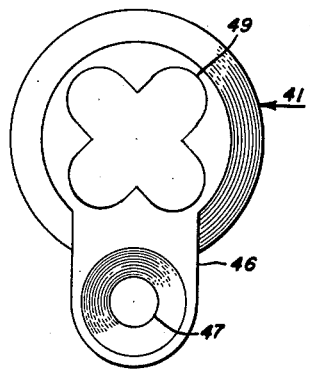
Figure 5:
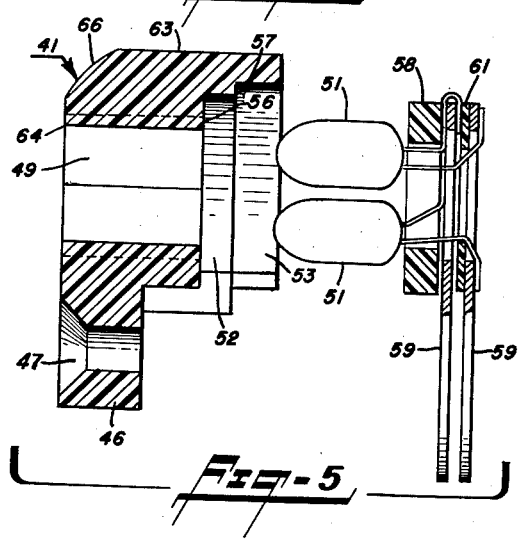
Figure 6:
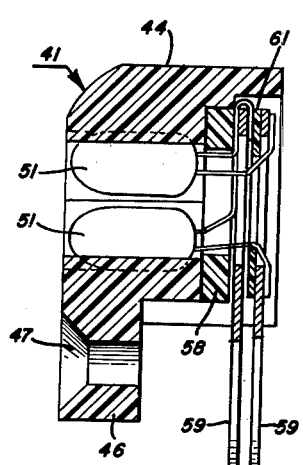
Figure 10B:
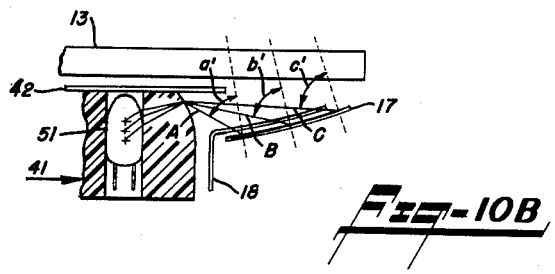
Figure 11:
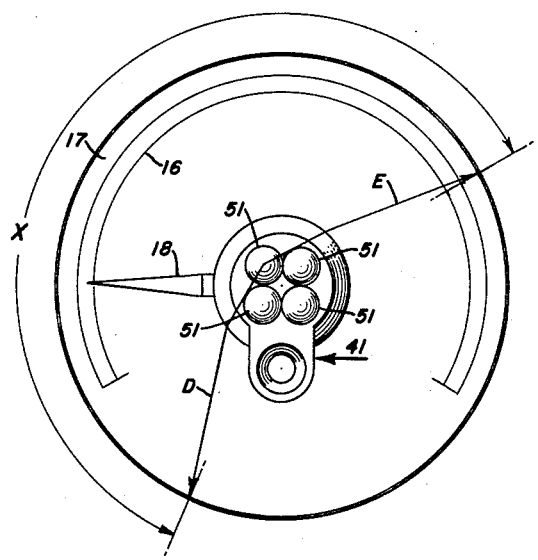
Figure 12:
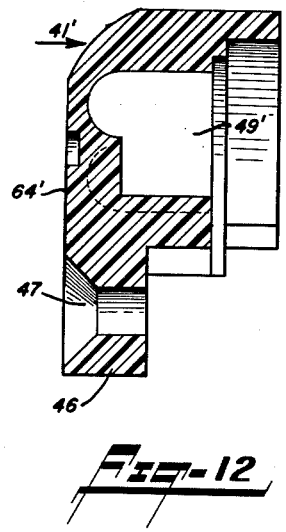

In the drawings wherein like reference characters denote like parts in the several views:
FIGURE 1 is a front view, with parts broken away for clarity, of an electrical instrument embodying the novel dial illuminating means of this invention;
FIGURE 2 is a fragmentary longitudinal central sectional view of the instrument;
FIGURE 3 is a fragmentary side view of the instrument showing the case broken away;
FIGURE 4 is a front view of the lighting hub employed in the illuminating means in the instrument of FIGURE 1;
FIGURE 5 is a longitudinal cross sectional view of the hub, shown in FIGURE 4, and showing a lamp assembly spaced therefrom prior to mounting the same in the hub;
FIG. 6 is similar to FIGURE 5 only showing the lamp assembly secured to the hub;
FIGURE 7 is a rear view of the assembly shown in FIGURE 6;
FIGURE 8 is a schematic representation of the light path from two of the lamps through the lighting hub and onto the dial;
FIGURES 9a and 9b are schematic representations illustrating the effect of the lighting hub on the illumination pattern from an individual lamp;
FIGURES 10a and 10b are schematic representations illustrating the effect of the use of plane and dished scales;
FIGURE 11 is a schematic representation illustrating the manner in which the lamps contribute to the illumination of the dial; and
FIGURE 12 is a longitudinal section view of a modified form of lighting hub, or housing, embodying my invention.

Reference is first made to FIGURES 1-3 of the drawings wherein the instrument designated 11 comprises a relatively-deep cup-like metal case designated by the reference character 12, only the front or outer portion of which is shown in FIGURES 2 and 3. The open end of the case is closed by a transparent cover, or window, 13 suitably secured thereto by a clamping ring 14. A suitably calibrated scale 16, carried by a scale plate 17 and a cooperating pointer 18 are visible through the window 13.

The instrument shown embodying the lighting arrangement of my invention is of the permanent magnet movable coil type, however, it will here be understood that the lighting arrangement may be embodied in any type instrument; the particular instrument mechanism forming no part of this invention. To facilitate a proper understanding of the invention, it may here be mentioned that the pointer 18 is carried by a movable coil 19 which is supported for pivotal movement by suitable pivots and jewel screws, the upper jewel screw 21 being visible in FIGURE 2. The instrument magnetic structure assembly may comprise, for example, a U-shaped soft-iron yoke 22 with a pole piece 23 closing the open ends thereof. A small rectangular-shaped block magnet 24 abuts the yoke at one polar surface thereof and a soft-iron core 26 at the other polar surface. The instrument illustrated is of the single air gap type wherein one side of the coil 19 operates within a bore in the core 26 while the other side thereof operates within a magnetic flux gap formed between the core and the inner surface of the pole piece.

Front and back mounting plates 27 and 28, respectively, which are made of non-magnetic material are suitably secured to the yoke 22, pole piece 23 and core 26 and serve to accurately position and hold the magnetic structure together. Posts 31 secured to the mounting plates 27 and 28 as by riveting, or the like, serve to support the front and rear instrument bridges which, in turn, support the jewel screws; only the front instrument bridge 32 being shown in the drawings. Longer posts 33, also suitably secured to the front mounting plate 27 serve to support a scale backing plate 34, the plate 34 being secured to the posts as by screws 36. The scale plate 17 is secured to the scale backing plate 34 by screws 37. The scale plate and scale backing plate are provided with generally circular-shaped central openings 38 and 39, respectively, through which openings the pointer 18 extends.

In addition to supporting the scale plate 17, the scale backing plate 34 provides a support for the novel dial illuminating means of my invention, which means includes a transparent hub member 41 and plane light shield 42 which are secured to the plate 34 by a single screw 43 extending through suitable cooperating holes in the shield 42 and hub 41, and which screw threadedly engages a tapped hole in the plate 34. The lighting hub includes a generally cylindrical shaped body portion 44 extending through the central apertures 38 and 39 in the dial and dial backing plate 17 and 34, respectively, coaxially with the instrument axis.

Reference is now made to FIGURES 4-7 of the drawings for a detailed description of the transparent lighting hub and lamp assembly for use therein. The hub, or housing 41, which is of a generally cylindrical shape, includes a radially extending mounting lug 46 integrally formed thereon adjacent the forward end thereof, through which lug an axially extending counter-sunk hole 47 is formed to accommodate the mounting screw 43 (FIGURE 2). In addition, the counter-sunk portion of the hole 47 accommodates a flared portion of the light shield 42 adjacent the mounting hole in the said shield. An axially-positioned, specially shaped, hole 49 extends through the housing 41 for the support of lamps 51. In FIGURES 4-7, the hole 49 is shown formed at the forward end thereof, with four radially extending depressions for the accommodation of a cluster of four lamps 51. It will here be understood that although the use of a plurality of lamps is preferred in the dial illuminating arrangement of my invention (and preferably an assembly including three or four lamps) certain important features of this invention may be included in a lighting arrangement in which only one lamp is utilized. The rearward end of the hole 49 is formed with progressively larger diameter cylindrical-shaped portions 52 and 53, whereby shoulders 56 and 57 are formed between the shaped hole portion and portion 52, and the cylindrical portions 52 and 53, respectively.

The lamp assembly for use in the lighting hub, or housing, 41 comprises, as best seen in FIGURE 5, an annular base 58 of insulating material, and a pair of terminals 59, 59 separated by an annular insulating washer 61. The two lead wires from each lamp extend through the bore in the base 52 and are soldered, or otherwise suitably secured, to the individual terminals 59, 59. The base, terminals and insulating washer are then cemented, or otherwise suitably secured together (as shown in FIGURE 5), to form a unitary lamp assembly. The lamp assembly is then placed on the housing (as shown in FIGURE 6) with the base 58 abutting the shoulder 56 and secured, as by cementing and potting, therein.

The generally cylindrical-shaped outer surface, designated 63, of the hub 41 and the flat front face thereof, designated 64, are joined by a generally annular, convexly curved or rounded, lens surface 66 through which light from the lamps 51 emanates. The cylindrical side 63 of the hub is coated with an opaque substance, such as black paint, for example, to thereby prevent the passage of light therethrough. The light shield 42 (FIGURE 2) at the front of the hub 41 is opaque and also preferably painted black, to prevent the light from the lamps from passing directly through the transparent cover 13 to the viewer. Thus, it will be understood, therefore, that substantially the entire illumination for the dial 17 from the lamps 51 passes through the curved lens portion 66 of the hub.

Reference is now made to the schematic presentation of FIGURE 8 wherein it will be noted that the light from the lamps is refracted in passing through the axially located lighting hub 41 to provide proper illumination of the dial 17. As seen in FIGURE 8, rays emanating from the lamps 51 fall incident to the internal interface of the lighting hub at an angle to the normal whereupon refraction occurs in the direction of the external curved surface 66. Upon emerging from the hub, the light is again refracted since the incident light on the curved surface 66 is not at the normal. This refraction is in the direction of the dial 17, away from the transparent cover 13. Stray light, or that light directly visible to the eye of the observer, is thereby reduced to a minimum.

The external refracting surface 66 is curved to produce a lens effect on the light from the lamps. Although the refracting surface 66 could be of a generally frusto-conical shape, the use of an also axially or longitudinally curved refracting surface is preferred. It will be apparent that if the surface 66 were merely of a generally frusto-conical shape, the rays from the lamps would be refracted in about the same manner as illustrated in FIGURE 8 due to the prismatic effect of the relatively inclined internal and external interfaces of such a hub. By convexly curving the external interface toward the axis, however, I obtain a lens effect to focus the rays on, and thereby further improve the illumination of, the dial. Reference is now made to FIGURES 9a and 9b for an explanation of the lens effect of the lighting hub. If no hub 41 were used, direct lamp lighting, such as illustrated in FIGURE 9a, would result. By utilizing a hub with a doubly curved external interface 66, as shown in FIGURE 9b, the same rays from the lamp illustrated in FIGURE 9a are focused to produce a beam of substantially parallel rays. It will be understood that by focusing the beam, the intensity of the illumination on the dial is greater for a predetermined number of lamps than without focusing thereof.

With the arrangement of my invention, the dial illumination is further improved by utilizing a dial in the form of a shallow dish, as seen in FIGURES 1-3 and 8. Reference is made to FIGURES 10a and 10b for an explanation of the improved effect which results from the use of a dished dial. Referring, first, to FIGURE 10a, it will be noted that the incident angle $a$, $b$ and $c$, of the lights rays A, B and C, respectively, on the flat dial 17' increases rapidly with increasing distance from the light source. (The rays A, B and C being shown coming from a single point on the hub 41). Since the intensity of light on the dial is dependent upon the cosine of the incident angle, it will be apparent the intensity decreases rapidly with increasing distance from the light source. By making the dial dish-shaped, as seen in FIGURE 10b, the incident angle $a'$, $b'$, $c'$, of the light rays A, B and C, respectively, is reduced with increased distance from the light source to thereby reduce the effect of the above-described cosine law. The pointer is also curved to conform to the curvature of the dial. In addition, the dished-scale plate 17 places the scale markings 16 and graduations closer to the transparent cover to improve the visibility thereof. My invention is, obviously, not limited to a lighting arrangement which includes a dished scale plate since a flat scale plate may be employed.

As mentioned above, a plurality of lamps 51 are preferably used rather than a single lamp in the lighting arrangement of my invention. Reference is made to FIGURE 11 of the drawings for an explanation of the function and advantages of the use of a plurality of lamps. In FIGURE 11, the sector of the scale effectively illuminated by the one lamp at the upper left quadrant of the lighting hub is illustrated by means of the light rays designated D and E passing through the hub adjacent the diametrically opposed lamps at the upper right and lower left quadrant of the hub. Since the lamps are not positioned at the axis of the hub, refraction occurs at the external interface of the hub whereby a radial sector, designated X, of the scale plate 17, of over 200 degrees is illuminated by the one lamp. With all four lamps energized, it will be apparent that the sector illuminated by each lamp overlaps that sector illuminated by every other lamp. Such lamp placement aids in providing uniformity of both color and light distribution. As is well understood by those skilled in this art, it is common practice in aircraft instruments to provide the dial with a black background with a white scale and graduations. In order not to impair the night vision of the pilot, the dial is illuminated by means of red light. It will be understood that it is not always possible to select a plurality of lamps 51 having the same red coloring. Hence, the red light emanating from the individual lamps may be of slightly different shades. A relatively uniform color presentation is obtained, however, since overlapping illumination is provided by the lamp assembly. In addition, adequate illumination throughout the presentation is provided in the event of failure of one of the lamps.

Having now described my invention in detail, in accordance with the patent statutes, various changes and modifications will suggest themselves to those skilled in this art. An example of a modified hub structure is shown in FIGURE 12 of the drawings. The hub shown in FIGURE 12, and designated 41', is formed with a shaped hole 49' which extends from the rear thereof and terminates a spaced distance from the front flat surface 64' thereof. The hole 49' shown is shaped to accommodate a cluster, or assembly of three lamps. It will be apparent, then, that the invention is not limited to the number of lamps used, nor to the extent of the lamp accommodating hole in the hub. It is intended that such changes and modifications shall fall within the spirit and scope of the invention as recited in the following claims.

I claim:

1. An instrument dial illuminating arrangement for use in an instrument including a cup-shaped case closed at the open end by a transparent cover, an instrument mechanism including a dial disposed within the case to be viewable through said cover; the said illuminating arrangement comprising a generally cylindrical-shaped hub of transparent material substantially coaxially mounted with the dial and extending through the dial to the cover side thereof, the said hub being formed with an axially and convexly rounded front outer peripheral corner portion thereby to focus light rays passing therethrough, means forming a longitudinally extending hole in the hub, illuminating means positioned within the hole in the hub whereby light therefrom is refracted at the hole interface and again refracted at the rounded corner portion of the hub with the refracted light being concentrated and directed onto the face of the dial to illuminate the same.

2. The invention as recited in claim 1 wherein the dial is dish-shaped whereby the incident angle of the light on the dial from the hub is greater adjacent the outer edge of the dial than near the center thereof.

3. The invention as recited in claim 2 including opaque means coated on the generally cylindrical side walls of the hub whereby substantially all of the light from the illuminating means onto the dial pass through the rounded corner portion of the hub.

References Cited in the file of this patent

UNITED STATES PATENTS

| | | |
|---|---|---|
| 2,173,316 | Sproule | Sept. 19, 1939 |
| 2,220,145 | Cooke | Nov. 5, 1940 |
| 2,696,550 | Neugass | Dec. 7, 1954 |
| 2,772,651 | Amico | Dec. 4, 1956 |
| 2,868,959 | Mayo et al. | Jan. 13, 1959 |
| 2,874,671 | Blackwell et al. | Feb. 24, 1959 |
| 2,948,073 | Roper | Aug. 9, 1960 |
| 2,980,056 | Achilich | Apr. 18, 1961 |

FOREIGN PATENTS

| | | |
|---|---|---|
| 7311 | Great Britain | Sept. 2, 1909 |